United States Patent [19]
Groves

[11] Patent Number: 6,008,286
[45] Date of Patent: Dec. 28, 1999

[54] PRIMER COMPOSITION AND BONDING OF ORGANIC POLYMERIC SUBSTRATES

[75] Inventor: James D. Groves, Hudson, Wis.

[73] Assignee: 3M Innovative Properties Company, Saint Paul, Minn.

[21] Appl. No.: 08/897,096

[22] Filed: Jul. 18, 1997

[51] Int. Cl.$^6$ .................................................. C08L 75/04
[52] U.S. Cl. .................. 524/505; 524/507; 524/517; 524/519; 525/65; 525/66; 525/92 C; 525/92 H; 525/101; 525/108; 525/125; 525/127
[58] Field of Search .................. 525/125, 92 C, 525/66, 127, 65, 92 H, 101, 108; 524/505, 507, 517, 519

[56] References Cited

U.S. PATENT DOCUMENTS

| | | | |
|---|---|---|---|
| 3,326,742 | 6/1967 | Shepherd | 161/227 |
| 3,862,883 | 1/1975 | Cantor | 161/215 |
| 3,968,316 | 7/1976 | Jyo et al. | 428/492 |
| 3,991,255 | 11/1976 | Blaskiewicz et al. | 428/425 |
| 4,160,331 | 7/1979 | Bell . | |
| 4,314,827 | 2/1982 | Leitheiser et al. . | |
| 4,623,364 | 11/1986 | Cottringer et al. . | |
| 4,652,275 | 3/1987 | Bloecher et al. . | |
| 4,668,576 | 5/1987 | Yotsuya et al. | 428/353 |
| 4,744,802 | 5/1988 | Schwabel . | |
| 4,770,671 | 9/1988 | Monroe et al. . | |
| 4,799,939 | 1/1989 | Bloecher et al. . | |
| 4,881,951 | 11/1989 | Wood et al. . | |
| 4,914,149 | 4/1990 | Fleming et al. | 524/507 |
| 4,945,016 | 7/1990 | Murachi | 524/81 |
| 5,009,676 | 4/1991 | Rue et al. . | |
| 5,038,500 | 8/1991 | Nicholson | 36/59 C |
| 5,090,968 | 2/1992 | Pellow . | |
| 5,201,916 | 4/1993 | Berg et al. . | |
| 5,366,523 | 11/1994 | Rowenhorst et al. . | |
| 5,396,717 | 3/1995 | Bell | 36/7.3 |
| 5,430,093 | 7/1995 | Miyamoto et al. | 524/504 |
| 5,462,617 | 10/1995 | Bender et al. | 156/96 |
| 5,500,273 | 3/1996 | Holmes et al. . | |
| 5,602,202 | 2/1997 | Groves | 525/73 |
| 5,623,010 | 4/1997 | Groves | 524/174 |

FOREIGN PATENT DOCUMENTS

| | | | |
|---|---|---|---|
| 55-018462 | 7/1978 | Japan | 525/125 |
| 54-158499 | 12/1979 | Japan . | |
| 55-18462 | 2/1980 | Japan . | |
| 58017174 | 2/1983 | Japan . | |
| 62-270671 | 11/1987 | Japan . | |
| 63225682 | 9/1988 | Japan . | |
| 58-17174 | 2/1993 | Japan . | |
| 1 293 842 | 10/1972 | United Kingdom | A43B 9/12 |
| 1 295 677 | 11/1972 | United Kingdom | A43B 13/32 |
| 1 458 007 | 12/1976 | United Kingdom | A43B 13/32 |
| 1 460 043 | 12/1976 | United Kingdom | C08J 7/12 |
| 2 048 897 | 12/1980 | United Kingdom | C08F 8/20 |
| 2 048 897 B | 12/1980 | United Kingdom | C08F 8/20 |
| WO 95/19393 | 7/1995 | WIPO | C08L 51/100 |

OTHER PUBLICATIONS

"American National Standard for Grading of Certain Abrasive Grain on Coated Abrasive Material", ANSI B74.18–1977, pp. 1–29 (1977).

"Accessory Laboratory Operations" in *Laboratory Experiments in Organic Chemistry*; R. Adams et al., Eds.; Collier–MacMillan: London; pp. 94 and 162–166 (1970).

*Hawley's Condensed Chemical Dictionary Eleventh Edition*; N. Sax et al., Eds.; Van Nostrand Reinhold: NY, pp. 453–454 (1987).

*Primary Examiner*—Patricia A. Short
*Attorney, Agent, or Firm*—Michaele A. Hakamaki

[57] ABSTRACT

The present invention provides a primer composition comprising an aliphatic isocyanate-containing compound, a non-halogenated hydrocarbon polymer containing organic functional groups, a halogenated hydrocarbon polymer optionally containing organic functional groups, and an organic solvent.

28 Claims, 1 Drawing Sheet

PRIMER COMPOSITION AND BONDING OF ORGANIC POLYMERIC SUBSTRATES

FIELD OF THE INVENTION

The present invention relates to a surface treatment or primer composition that improves the adherence of materials such as adhesives, inks, and coatings to organic polymeric substrates, particularly substrates made of organic high polymers.

BACKGROUND OF THE INVENTION

Many organic high polymers (i.e. large molecules, typically greater than about 10,000 number average molecular weight, composed of repeat units of low molecular weight species, for example, ethylene, propylene, butene, octene, butadiene, styrene and combinations thereof) have surface characteristics that render them difficult to bond to adhesives, inks, and coatings, using conventional bonding agents and methods. Examples of these polymers of low surface energy are polyethylene (PE), polypropylene (PP), ethylene-propylene-diene terpolymer (EPDM) and ethylene/α-olefin copolymers. Various proposals have been made to overcome these disadvantages.

For example, compositions of styrene-ethylene/butylene-styrene block copolymers and acrylic polymers in a solvent mixture for priming polymers of low surface energy are known. These compositions improve the bonding of pressure sensitive and structural adhesives to such polymers.

Also, it is known that the receptiveness of rubbers (e.g., styrene/butadiene copolymers (SBR) used for shoe soling) and other solid high polymers toward bonding with adhesives (e.g., solvent-based polyurethane and polychloroprenes) is improved by the chlorination of the surface with solutions of halogen donors, such as trichloroisocyanuric acid and N,N-dichlorobenzene sulfonamide. This can be done, for example, by incorporating the halogen donor into a primer or the adhesive itself Typically, however, solutions containing only halogen donors are effective only on substrates containing a high level of ethylenic unsaturation. Also, adhesive compositions, such as polyurethane adhesives, containing a halogen donor have limited stability.

Primer compositions and adhesive compositions (e.g., hydroxy-terminated polyurethane adhesives) that display improved adhesion to organic high polymers having low levels of ethylenic unsaturation are known. Such primer compositions typically contain halogen donors (e.g., dibromodimethylhydantion and trichloroisocyanuric acid) and aromatic isocyanates (i.e., compounds in which isocyanate groups are directly attached to an aromatic carbon, such as in 4,4'-diphenylmethane diisocyanate). See, for example, British Patent Application Nos. 1,458,007 (published Dec. 8, 1976) and 1,460,043 (published Dec. 31, 1976). However, such compositions typically have shelf-lives of less than about 7 days. Thus, they cannot be readily shipped as a one-part system because they must be mixed shortly before use. In addition, the primed substrate will yellow and discolor on exposure to UV radiation due to the presence of the aromatic group in the isocyanate compound. This is undesirable, for example, on white or clear rubber stock.

Compositions of a halogen donor such as trichloroisocyanuric acid, an aliphatic isocyanate-containing compound and an organic solvent are known (Groves, U.S. patent application Ser. No. 08/725,637, filed Oct. 8, 1996) for improving adhesion of adhesives, inks, coatings, and the like, to substrates. These primer compositions are particularly effective on organic polymeric substrates containing some degree of ethylenic unsaturation such as polybutadiene, polyisoprene, natural rubber, styrene-butadiene copolymers, polychloroprene, and the like. However, substrates that contain low levels of, or no, ethylenic unsaturation such as ethylene-vinyl acetate copolymers (EVA), ethylene-propylene-diene terpolymer (EPDM), polypropylene (PP), polyethylene (PE), and ethylene/α-olefin copolymers do not typically bond well to adhesives, inks, coatings, and the like, although the above-identified compositions of U.S. patent application Ser. No. 30 08/725,637 do provide improved adhesion. For such substrates, mechanical roughening of the surface prior to the application of these primer compositions may be required. However, abrasion of the substrates is not economical and is not always easy or convenient. Thus, there is still a need for primer compositions and application procedures that will even more effectively prime a variety of different substrates, including polymers with little or no ethylenic unsaturation without abrasion. In addition, such primer compositions should possess a long shelf-life and, after application, be stable to UV radiation and high temperature and humidity.

SUMMARY OF INVENTION

The present invention provides a primer composition comprising an aliphatic isocyanate-containing compound, a nonhalogenated hydrocarbon polymer containing organic functional groups, a halogenated hydrocarbon polymer optionally containing organic functional groups, and an organic solvent. These components may or may not react significantly upon mixing. Thus, the compositions of the present invention include an incipient nonhalogenated hydrocarbon polymer containing organic functional groups, an incipient aliphatic isocyanate-containing compound, and an incipient halogenated hydrocarbon polymer optionally containing organic functional groups, and/or reaction products thereof, and an organic solvent.

In a preferred embodiment, the primer composition comprises a solution of: an aliphatic isocyanate-containing compound selected from the group of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, and oligomers and combinations thereof, a nonhalogenated hydrocarbon polymer containing organic functional groups, wherein the functional groups are selected from the group of carboxylic acid anhydride groups, hydroxyl groups, epoxide groups, carboxylic acid ester groups, carboxylic acid amide groups, carboxylic acid groups, and combinations thereof; a halogenated hydrocarbon polymer optionally containing organic functional groups, wherein the polymer is selected from the group of a chlorinated polypropylene, a chlorinated polyethylene, a chlorosulfonated polyethylene, a chlorosulfonated polypropylene, a chlorinated polypropylene modified with maleic anhydride, a chlorinated polyethylene modified with maleic anhydride, and blends or reaction products thereof; and an organic solvent. Examples of the nonhalogenated hydrocarbon polymer containing organic functional groups includes a styrene-ethylene/butylene-styrene triblock copolymer modified with maleic anhydride, an ethylene-propylene copolymer modified with maleic anhydride, a propylene polymer modified with maleic anhydride, an ethylene/butylene copolymer containing hydroxyl endgroups, an ethylene vinyl acetate copolymer, an ethylene vinyl acetate copolymer modified with maleic anhydride, and blends or reaction products thereof (i.e., of two or more of these polymers).

The present invention also provides a method for adhering two substrates together and the article prepared according to this method. The method involves: applying a primer composition to a surface of a first organic polymeric substrate to provide a primed surface; wherein the primer composition is preparable by combining components comprising an aliphatic isocyanate-containing compound, a nonhalogenated hydrocarbon polymer containing organic functional groups, a halogenated hydrocarbon polymer optionally containing organic functional groups, and an organic solvent; applying an adhesive to the primed surface or to a surface of a second substrate; and positioning the surfaces of the first and second substrates together to form a bond.

DETAILED DESCRIPTION

Figure 1:
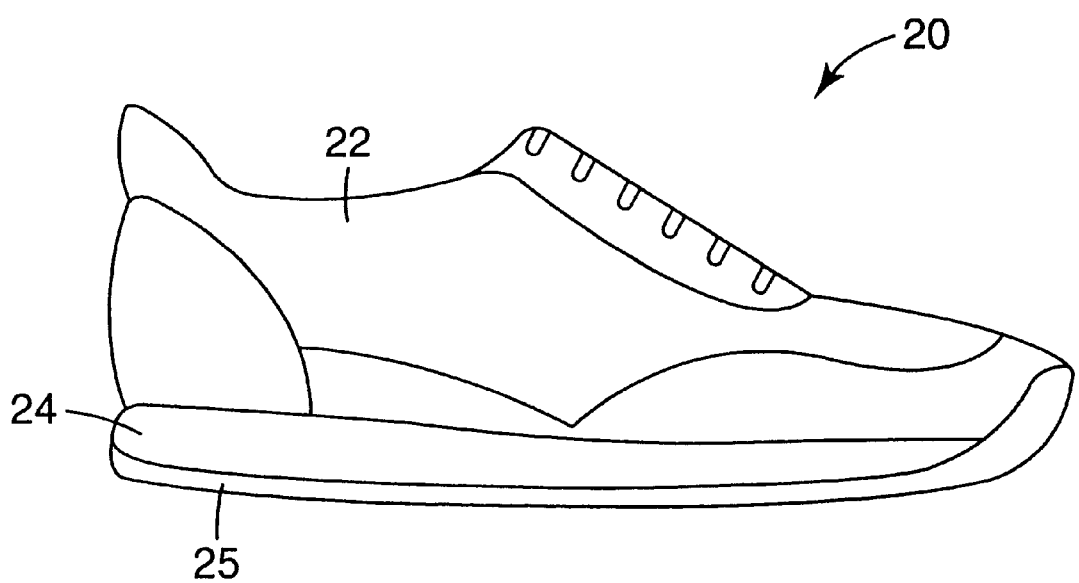
FIGURE 1 is a side view of a shoe in accordance with the present invention.

The present invention provides primer compositions prepared by combining a nonhalogenated hydrocarbon polymer containing organic functional groups, an aliphatic isocyanate-containing compound, and a halogenated hydrocarbon polymer optionally containing organic functional groups in an organic solvent. Although not intending to be limiting, it is believed that these components are reactive towards each other or other components in the composition through their functional groups, although not so reactive as to have unstable compositions when stored in a substantially moisture-free environment. Thus, the compositions of the present invention include an incipient nonhalogenated hydrocarbon polymer containing organic functional groups, an incipient aliphatic isocyanate-containing compound, and an incipient halogenated hydrocarbon polymer optionally containing organic functional groups, and/or reaction products thereof, and an organic solvent The primer compositions of the present invention are stable at elevated temperatures up to about 60° C. for at least 60 days, when stored in a substantially moisture-free environment. As used herein, "stable" refers to a composition that does not decompose, react, precipitate, or significantly discolor during the specified time when stored in a substantially moisture-free environment. That is, the composition is substantially unchanged after a period of time when stored in a substantially moisture-free environment. Herein, a "substantially moisture-free environment" is an environment from which substantially all atmospheric moisture has been removed. Typically, there is less than about 0.01% water in a "substantially moisture-free environment," such as a moisture-free solvent and/or a moisture-free atmosphere, as used herein.

Primer compositions according to the present invention typically effectively modify the surface of an organic polymeric substrate (e.g., substrates made of organic high polymers, which can be synthetic or natural, and are typically elastomeric materials) for improved adhesion of adhesives, inks, and other coatings. As used herein, elastomer or elastomeric material is used in its conventional manner to refer to a material with rubber-like characteristics, as defined by Hawley's Condensed Chemical Dictionary, Eleventh Edition, 1987, New York, N.Y., which is incorporated herein by reference. This includes materials that are capable of retracting quickly to approximately their original length after being stretched to at least twice their original length, such as crosslinked polymers like natural and synthetic rubbers. This also includes materials such as uncrosslinked polyolefins that are thermoplastic, which may yield upon stretching.

Primer compositions according to the present invention also preferably have relatively long shelf-lives and preferably do not significantly discolor upon exposure to UV light. Such primers are typically effective on a wide variety of organic polymeric substrates having low surface energies, thereby rendering the primed substrates adherent to adhesives, inks, coatings, and the like. This allows for improved adhesion to other organic polymeric substrates or other nonpolymeric substrates, such as glass, metal, ceramic, and the like, using a variety of adhesives.

Further, such primers are generally particularly effective on organic polymeric substrates containing low levels of, or no, ethylenic unsaturation, such as ethylene-propylene-diene terpolymer, ethylene propylene rubber, butyl and bromobutyl rubber, ethylene/α-olefin copolymer, polypropylene, and polyethylene. Also, adhesion to substrates that contain some degree of unsaturation, such as polybutadiene, polychloroprene, polyisoprene, natural rubber, isobutylene-isoprene copolymer, styrene-butadiene copolymer, and styrene-butadiene-styrene block copolymer can be improved by the primer compositions of the present invention. Significantly, other substrates, such as polyethylene vinyl acetate foam, as well as other organic high polymer substrates such as natural leather, are also effectively primed for adhesive bonding using the primers according to the present invention. The surface of the organic polymeric substrates can be mechanically roughened prior to priming to enhance adhesion, although this is not a requirement.

Suitable aliphatic isocyanate-containing compounds useful in making primer compositions according to the present invention are those in which the isocyanate (—NCO) groups are directly attached to aliphatic carbons. Although not typically preferred, the aliphatic isocyanate-containing compounds may include aromatic moieties. Thus, the aliphatic isocyanate-containing compounds may include unsaturation, although saturated materials are typically preferred.

The isocyanate-containing compound can be in the form of monomers, oligomers, or polymers, as long as there are available (i.e., unreacted) isocyanate groups. Examples of such aliphatic isocyanate-containing compounds include, but are not limited to, monomers such as 1,6-hexamethylene diisocyanate, methylene bis(4-cyclohexyl isocyanate), trimethylhexamethylene diisocyanate, isophorone diisocyanate, γ-isocyanatopropyl trimethoxysilane, dimer acid diisocyanate, xylene diisocyanate, benzene-1,3-bis(1-isocyanato-1-methylethyl), and benzene-1,4-bis(1-isocyanato-1-methylethyl), oligomers of aliphatic isocyanate monomers, and polymers or prepolymers (i.e., reaction products) of aliphatic isocyanates with active hydrogen-containing compounds. Of these, isophorone diisocyanate, γ-isocyanatopropyl trimethoxysilane, and oligomers and combinations thereof are preferred. Oligomers of aliphatic isocyanates, such as the trimer of isophorone diisocyanate, which is available under the trade designation "VESTANAT T1890E" from Hüils America, Incorporated, Piscataway, N.J., are particularly preferred because they are less volatile and therefore less toxic than monomeric isocyanates.

The reaction products of aliphatic isocyanates with active hydrogen-containing compounds are suitable if they contain unreacted isocyanate groups. Any of the above-listed aliphatic isocyanates can be used to make such materials. Examples of active hydrogen-containing compounds include, but are not limited to, ethylene glycol, 1,4-butanediol, 1,6-hexanediol, trimethylol propane, pentaerythritol, 1,4-cyclohexane dimethanol, polyester polyol, polycarbonate polyol, polytetramethylene oxide polyether polyol, polypropylene oxide polyether polyol, and polyethylene oxide polyol. Mixtures of the aliphatic isocyanate-containing monomers, oligomers, and/or prepolymers have also been found to be useful.

Suitable nonhalogenated hydrocarbon polymers are those that contain organic functional groups such as carboxylic acid anhydride groups, hydroxyl groups, epoxide groups, carboxylic acid ester groups, carboxylic acid amide groups, carboxylic acid groups, and the like. Examples of suitable hydrocarbon polymers containing functional groups include, but are not limited to, a styrene-ethylene/butylene-styrene triblock copolymer modified with maleic anhydride, an ethylene-propylene copolymer modified with maleic anhydride, a propylene polymer modified with maleic anhydride, an ethylene/butylene copolymer containing hydroxyl end groups, an ethylene vinyl acetate copolymer, an ethylene vinyl acetate copolymer modified with maleic anhydride and blends or reaction products of two or more of these polymers. Of these, a maleated styrene-ethylene/butylene-styrene containing about 2% by weight of succinic anhydride, which is available under the trade designation "KRATON FG-1901X" from Shell Chemical Company, Houston, Tex., an ethylene/butylene copolymer containing hydroxyl end groups, which is available under the trade designation "HPVM 2203" from Shell Chemical Company, Houston, Tex., a maleic anhydride modified ethylene vinyl acetate copolymer, which is available under the trade designation "FUSABOND MC-190D" from DuPont Canada, Incorporated, Mississauga, Ontario, Canada, and an ethylene vinyl acetate copolymer containing 72% ethylene, which is available from Polysciences, Incorporated, Warrington, Pa., are particularly preferred. Mixtures of these polymers have also been found to be useful.

Suitable halogenated hydrocarbon polymers optionally containing organic functional groups useful in making primer compositions according to the present invention are those polymers that are simply halogenated as well as those that are halogenated and contain organic functional groups such as sulfonate groups, carboxylic acid anhydride groups, hydroxyl groups, epoxide groups, carboxylic acid ester groups, carboxylic acid amide groups, carboxylic acid groups, and the like. Examples of suitable halogenated hydrocarbon polymers optionally containing organic functional groups include, but are not limited to, a chlorinated polypropylene, a chlorinated polyethylene, a chlorosulfonated polyethylene, a chlorinated polypropylene modified with maleic anhydride, a chlorinated polyethylene modified with maleic anhydride, and blends or reaction products thereof. Of these, a chlorosulfonated polyethylene, which is available under the trade designation "HYPALON CP827B" from DuPont Polymer Products, Wilmington, Del., and a chlorinated polypropylene modified with maleic anhydride, which is available under the trade designation "CP 343-1" from Eastman Chemical Company, Kingsport, Tenn., are preferred.

Any of a wide range of organic solvents may be used, including, for example, aliphatic esters, aliphatic hydrocarbons, aromatic hydrocarbons, and halogenated aromatic or aliphatic hydrocarbons. Examples include, but are not limited to, cyclohexane, xylene, heptane, toluene, and hexane. Preferably, the organic solvent is a mixture of cyclohexane and xylene in weight ratios of about 95:5 to about 5:95, and more preferably about 80:20 to about 20:80 (cyclohexane to xylene).

Primer compositions according to the present invention include the aforementioned components in amounts sufficient for providing improved adhesion of inks, adhesives, and other coatings to high organic polymeric substrates. Preferably, the aliphatic isocyanate-containing compound is present in an amount of about 1% to about 15% by weight, and more preferably, about 1% to about 5% by weight, based on the total weight of the primer composition. Preferably, the nonhalogenated hydrocarbon polymer containing organic functional groups is present in an amount of about 0.25% to about 10% by weight, and more preferably, about 0.25% to about 5% by weight, based on the total weight of the primer composition. Preferably, the halogenated hydrocarbon polymer is present in an amount of about 0.5% to about 10% by weight, and more preferably, about 0.5% to about 5% by weight, based on the weight of the total primer composition. The organic solvent is preferably present in the primer composition of at least about 75% by weight, based on the total weight of the composition.

Primer compositions according to the present invention may further include additives. These include, for example, coupling agents such as silane coupling agents and acid scavengers such as epoxy resins. Typically, the additives are present in the primer compositions in an amount to provide the desired effect. Preferably, they do not exceed about 10% by weight, based on the total weight of the primer composition. They can be used alone or in various combinations.

Primer compositions according to the present invention are typically homogeneous solutions, although this is not a necessary requirement. They may be applied to a substrate using a variety of techniques including dipping, spraying, brushing, rotogravure coating, and Meir rod and knife coating. The primer is typically dried before the adhesive, ink, or other coating material is applied. In certain embodiments, the surface of the substrate is mechanically abraded prior to the primer being applied.

The adhesives, inks, and other coating materials that demonstrate improved adhesion to the primed organic high polymers (i.e., substrates coated with the primer compositions according to the present invention) can be thermosetting, thermoplastic, and hybrid materials (i.e., thermosetting and thermoplastic). The term hybrid as used herein refers to combinations of two or more different types of materials (e.g., adhesives) as well as two or more polymers suitable for forming adhesives, inks, and other coating materials. Typically, the material coated on the primed organic high polymers is an adhesive.

Thermosetting adhesives are generally formed by addition polymerization. Examples of thermosetting adhesives include polysulfides, silicones, polyesters, polyurethanes, epoxies, anaerobic and aerobic acrylics, radiation curable polymers and vulcanizing rubbers. Thermosetting adhesives typically cure by heat, catalysts or light or moisture activation. After curing, thermosetting adhesives are generally insoluble (i.e., the adhesive will not dissolve in an organic solvent or water) and infusible (i.e., the adhesive will not flow when heated).

Thermoplastic adhesives are soluble and fusible materials. Examples of thermoplastic adhesives include vinyl adhesives (e.g., polyvinyl chloride, polyvinyl butyral, polyvinyl alkyl esters and ethers and vinyl acetate-ethylene copolymer adhesives, acrylic adhesives, and polyurethane adhesives), hot melt adhesives, cellulosic adhesives, and asphalt-based adhesives. Thermoplastic adhesives may be in the form of emulsions, solutions, or solids.

When the primer composition is applied to a substrate, it is typically allowed to dry prior to application of the coating, typically an adhesive. The adhesive may include components that react with the aliphatic isocyanate-containing compound. For example, polyurethane-based adhesives and epoxy-based adhesives may react with the aliphatic isocyanate-containing compounds. In order to increase the rate of reaction between the aliphatic isocyanate-containing compound and the polyurethane-based adhesive, a catalyst may be added to the adhesive, although this is not required. Examples of such catalysts include dialkyltin dicarboxylates, mixtures of dialkyltin dicarboxylates and trialkyltin oxides, metal acetyl acetonates, metal carboxylates, mixtures of metal acetyl acetonates and tertiary amines, and the like.

Primer compositions according to the present invention may be used in the manufacture of any of a wide variety of articles such as footwear, particularly footwear with elastomeric components such as athletic shoes, as well as tennis rackets and roofing membranes. They are also suitable for bonding two organic polymeric substrates together, or one such substrate to a variety of other substrates such as those containing metal, glass, ceramic, wood, cotton or other fabrics, and the like.

Primer compositions according to the present invention are particularly useful in the manufacture of footwear with elastomeric soles, such as athletic shoes. Referring to FIG. 1, an athletic shoe 20 is shown, which has upper 22, midsole 24, and sole (or outsole) 25. In the manufacture of athletic shoes 20, for example, the primer composition is applied by spraying, brushing, or wiping to the attachment side of a sole 26, such as a rubber sole. Typically, the solvent is removed by evaporation (e.g., air drying) to form a primed surface. The primed surface of the sole 26 is then treated in the conventional manner by applying adhesive, preferably a polyurethane adhesive. If the adhesive is solvent based, the solvent is allowed to evaporate. The upper portion 22, and optionally the midsole 24 and sole (or outsole) 25, of the shoe 20 may be coated with the primer composition, allowed to dry, and coated with the same or a different adhesive and any solvent allowed to evaporate. When the adhesives have dried, the sole 26, the midsole 24, sole (or outsole) 25, and upper 22 are bonded in a conventional manner, typically with heat reactivation of the adhesive coatings. For example, the adhesive on the sole may be reactivated at about 80° C. and the sole applied to the upper, which may or may not have been heat reactivated. The assembly is then treated in a manner known in the art, such as using a press at an elevated pressure.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Examples 1–5, Comparative Example A: Functional vs. Non-Functional Hydrocarbon Polymers Preparation of Example 1

A primer composition of this invention, containing a nonhalogenated hydrocarbon polymer having functional groups was prepared as follows. A 20 ml glass vial was dried at 120° C. for 30 minutes, capped and cooled. A solvent mixture of cyclohexane and xylene in a weight ratio of 3.0:2.0 was dried over molecular sieves, available under the trade designation "Type 4A, Grade 514" from W. R. Grace and Company, Davison Chemical Division, Baltimore, Md., to remove residual water. The cap was removed and 10.0 grams of the dried solvent mixture, 0.05 gram of maleated styrene-ethylene/butylene-styrene triblock copolymer, which is available under the trade designation "KRATON FG-1901X" from Shell Chemical Company, Houston, Tex., 0.14 grams of chlorinated polypropylene, which is available under the trade designation "CP 343-1" from Eastman Chemical Company, Kingsport, Tenn., and 0.20 grams of isophorone diisocyanate trimer solution, which is available as 70% isophorone trimer in butyl acetate under the trade designation "VESTANAT T189E" from Hüls America, Incorporated, Piscataway, N.J., were added to the vial.

Preparation of Example 2

The composition of Example 2 was prepared as described in Example 1 except ethylene/butylene copolymer diol, which is available under the trade designation "HPVM 2203" from Shell Chemical Company, Houston, Tex., was used in place of the maleated styrene-ethylene/butylene-styrene triblock copolymer.

Preparation of Example 3

The composition of Example 3 was prepared as described in Example 1 except polyethylene vinyl acetate (72% ethylene), which is available from Polysciences, Incorporated, Warrington, Pa., was used in place of the maleated styrene-ethylene/butylene-styrene triblock copolymer.

Preparation of Example 4

The composition of Example 4 was prepared as described in Example 1 except maleated polyethylene vinyl acetate, which is available under the trade designation "FUSABOND MC-190D" from DuPont Canada, Incorporated, Mississauga, Ontario, Canada, was used in place of the maleated styrene-ethylene/butylene-styrene triblock copolymer.

Preparation of Example 5

The composition of Example 5 was prepared by blending the composition of Example 1 with the composition of Example 2 in a weight ratio of 1.0:1.0.

Preparation of Comparative Example A

A composition of a nonhalogenated hydrocarbon polymer containing no functional groups was prepared as described in Example 1, except that a styrene-ethylene/butylene-styrene triblock copolymer, which is available under the trade designation "KRATON G-165T" from Shell Chemical Company, Houston, Tex., was used in place of the maleated styrene-ethylene/butylene-styrene triblock copolymer.

Examples 1–5 and Comparative Example A: Peel Values

Plaques of ethylene/1-octene copolymer, referred to as a polyolefin elastomer (POE), 200 mm×200 mm×6 mm, which is available under the trade designation "ENGAGE 8402" from DuPont Dow Elastomers L.L.C., Wilmington, Del., were die cut into 25 mm×100 mm×6 mm test specimens. For each of Examples 1–5 and Comparable Example A, three test specimens were cleaned twice with a lintless tissue, which is available under the trade designation "KIM-WIPF" from Kimberly-Clark Corporation, Roswell, Ga., saturated in a solvent mixture of cyclohexane and xylene in a weight ratio of 3.0:2.0. Within one minute the primer solutions of Examples 1–5 and Comparative Example A were brushed onto the specimens and allowed to dry for 30 minutes. A 20% by weight solution of a polycaprolactone polyurethane adhesive, which is available under the trade designation "DESMOCOLL 530" from Bayer Corporation, Pittsburgh, Pa., in methyl ethyl ketone was brushed onto the primed surface of each test specimen, except for a region about 25 mm from one end of the specimen, and allowed to dry for 30 minutes.

Five layers of the same polycaprolactone polyurethane adhesive successively brushed onto 49×30 (threads per inch) greige (unbleached and undyed) cotton No. 10 duck ribbon available from West Point Pepperell Inc., Palatine, Ill., 38 mm×100 mm×1 mm, about 75 mm from one end and allowed to dry for 30 minutes. The primed and adhesively coated test specimens and canvas ribbon were placed in a 70° C. oven for 5 minutes.

For each of Examples 1–5 and Comparative Example A, the adhesively coated sides of the test specimen and canvas were bonded together under about 10 kPa pressure to form a peel sample and allowed to stand for 7 days at room temperature and humidity. Each of the peel samples was mounted in an Instron tensile tester, which is available from Instron Corporation, Canton, Ma., to determine the 180° peel strength of the bonded specimens. The average of three 180° peel values at a jaw speed of 12.7 cm per minute for Examples 1–5 and Comparative Example A reported in Newtons/100 millimeters (N/100 mm) were 648, 517, 447, 386, 710 and 140, respectively.

These results demonstrate that primer compositions of this invention which contain nonhalogenated hydrocarbon polymers having organic functional groups, or mixtures thereof, greatly improves the adhesion of polyurethane adhesives to ethylene/α-olefin copolymers (POE) compared to primer compositions prepared with nonhalogenated non-fictional hydrocarbon polymers.

Examples 6–8: Alternative Aliphatic Isocyanates

Preparation of Example 6

The composition of Example 6 was prepared as described in Example 1, except an isophorone diisocyanate polyester prepolymer, which is available under the trade designation "AIRTHANE ASN-540M" from Air Products and Chemicals, Incorporated, Allentown, Pa., was used in place of the 70% isophorone diisocyanate trimer solution.

Preparation of Example 7

The composition of Example 7 was prepared as described in Example 1, except a dimer acid diisocyanate, which is available under the trade designation "DDI-1410" from Henkel Corporation, Kankakee, Ill., was used in place of the 70% isophorone diisocyanate trimer solution.

Preparation of Example 8

The composition of Example 8 was prepared by mixing the composition of Example 1 with the composition of Example 6 in a weight ratio of 1.0:1.0.

Examples 6–8: Peel Values

Ethylene/1-octene copolymer (POE) test specimens, 25 mm×100 mm×6 mm, were cleaned, primed with the compositions of Example 6–8, coated with polyurethane adhesive, and bonded to polyurethane coated cotton canvas ribbon as done in Examples 1–5. The 180° peel values were determined as described in Examples 1–5. The average of three 180° peel values for Examples 6–8, reported in N/100 mm, were 544, 386 and 754, respectively.

These results demonstrate that a number of aliphatic diisocyanates and mixtures thereof are also useful.

Examples 9 and 10: Alternative Chlorinated Polyolefins

Preparation of Example 9

The composition of Example 9 was prepared as described in Example 1 except chlorosulfonated polyethylene, which is available under the trade designation "HYPALON CP827B" from DuPont Polymer Products, Wilmington, Del., was used in place of the maleated chlorinated polypropylene.

Preparation of Example 10

The composition of Example 10 was prepared by mixing the composition of Example 1 with the composition of Example 9 in a weight ratio of 1.0:1.0.

Examples 9 and 10: Peel Values

Compression molded polyethylene vinyl acetate (EVA) foam plaques, 203 mm×203 mm×15 mm, density of 193.3 kg/m$^3$, which are available under the trade designation "ECLIPSE-5000" from Kim Incorporated, Kyeong Nam, Korea, were die-cut into test specimens, 25.4 mm×127 mm×15 mm.

Vulcanized EPDM rubber plaques, 127 mm×127 mm×2.5 mm, which are available under the trade designation "SHORE A-68" from Shin Ho Incorporated, Pusan, Korea, were die-cut into 25.4 mm×127 mm×2.5 mm test specimens.

Test specimens of POE of Examples 1–5, EVA and EPDM were cleaned and primed with the compositions of Examples 9 and 10, coated with the polyurethane adhesive solution and bonded to polyurethane adhesive coated cotton canvas ribbon as described in Examples 1–5. The 180° peel values determined as described in Examples 1–5. The average of three 180° peel values for the POE, EVA and EPDM specimens using the composition of Example 9, reported in N/100 mm, were 719, at least 526 (substrate failure), and 456, respectively; the average of three 180° peel values using the composition of Example 10, reported in N/100 mm, were 526, at least 525 (substrate failure), and 403, respectively.

These results demonstrate that a number of halogenated hydrocarbons and mixtures thereof are useful in the preparation of compositions of this invention.

Example 11 and Control I: Peel Values Using Various Substrates

Preparation of Control I

A priming solution, Control I, was prepared by combining 0.2 gram of chlorinated polypropylene, which is available under the trade designation "CP 343-1" from Eastman Chemical Company, Kingsport, Tenn., and 10.0 grams of the solvent mixture described in Examples 1–5 in a 20 ml dried glass vial.

Plaques, 127 mm×127 mm×3.1 mm, of a typical, vulcanized SBR rubber of the following formulation were prepared by Rubber Industries, Incorporated, Shakopee, Minn.: 65.0 parts SBR 1502, 35.0 parts per hundred rubber (phr) SBR 1904, 25.0 phr silica, 23.0 phr carbon black (N-330), 1.8 phr sulfur, 3.0 phr cumarone-indene resin (85° C.), 3.8 phr zinc oxide, 0.8 phr stearic acid, 1.1 phr N-cyclohexyl-2-benzothiazolesulfenamide, and 0.8 phr phenolic antioxidant. Die-cut test specimens of 25.4 mm×127 mm×3.1 mm were prepared from the plaques.

Vulcanized polybutadiene (PBR) rubber plaques, 127 mm×127 mm×2.5 mm, which are available under the trade designation "CRYSTAL II" from Shin Ho Incorporated, Pusan, Korea, were die-cut into 25.4 mm×127 mm×2.5 mm test specimens.

Thermoplastic polyolefin (TPO) plaques, 110 mm×300 mm×3.5 mm, which are available under the trade designation "ETA 3163" from Himont USA, Incorporated, Lansing, Mich., were die-cut into 110 mm×25.4 mm×3.5 mm test specimens.

Each of these test specimens, POE of Examples 1–5 and EVA and EPDM of Examples 9 and 10, were cleaned and primed with the composition of Example 1 and Control 1, coated with the polyurethane adhesive solution and bonded to polyurethane adhesive coated cotton canvas ribbon as described in Examples 1–5. The 180° peel values for the SBR, PBR, TPO, POE, EVA and EPDM specimens using the composition of Examples 1–5, reported in N/100 mm, were 368, 439, 596, 561, at least 554 (substrate failure) and 456, respectively. The average of three 180° peel values for SBR, PBR, TPO, POE, EVA and EPDM using the composition of Control I, reported in N/100 mm, were 54, 202, 119, 193, 368 and 81, respectively.

These results demonstrate that a primer solution of this invention substantially improves the peel values of a wide variety of adhesively bonded substrates compared to a control priming solution, known in the art.

Example 12: Peel Strengths Using Various Substrates

Test specimens of EVA foam and EPDM were cleaned, primed with the composition of Examples 9 and 10, coated with polyurethane adhesive solution and bonded together. The 180° peel values were determined as in Examples 1–5. The average of three 180° peel values, reported in N/100 mm, was 421.

Test specimens of POE, SBR and EVA foam were cleaned, primed with the composition of Example 1, coated with the polyurethane adhesive solution of Examples 1–5 and bonded together as previously described in Examples 1–5 to give test samples of POE/SBR, POE/EVA and SBR/EVA. The average of three 180° peel values, reported in N/100 mm, were 193, at least 526 (substrate failure) and at least 526 (substrate failure), respectively. This example demonstrates that a primer solution of this invention substantially improves the peel values of a wide variety of adhesively bonded substrates.

Example 13: Peel Strengths Using Various Adhesives

Test specimens of solvent cleaned POE were brushed with the composition of Example 1 and allowed to dry for 30 minutes. A thin layer of two-part epoxy adhesive, which is available under the trade designation "SCOTCHWELD 2216 B/A" Minnesota Mining and Manufacturing Company, St. Paul, Minn., was applied to the primed sides of the specimens and to one side of test specimens of unbleached and undyed cotton canvas ribbon. The adhesively coated sides of the POE and canvas ribbon were bonded together using hand pressure from a light rubber-covered roller. The bonded specimens were allowed to condition for 7 days prior to determining the 180° peel values. The average of three 180° peel values, reported in N/100 mm, was 351. This example illustrates that adhesives other than solvent-based polyurethanes result in high peel values to substrates primed with a composition of this invention.

Various modifications and alterations of this invention will become apparent to those skilled in the art without departing from the scope and spirit of this invention, and it should be understood that this invention is not to be unduly limited to the illustrative embodiments set forth herein. The complete disclosures of all patents, patent applications, and publications are incorporated herein by reference, as if individually incorporated.

What is claimed is:

1. A primer composition comprising an aliphatic isocyanate-containing compound, a nonhalogenated hydrocarbon polymer containing organic functional groups, a halogenated hydrocarbon polymer containing organic functional groups, and an organic solvent; wherein the halogenated hydrocarbon polymer containing organic functional groups is selected from the group consisting of a chlorosulfonated polyethylene, a chlorosulfonated polypropylene, a chlorinated polypropylene modified with maleic anhydride, a chlorinated polyethylene modified with maleic anhydride, and blends or reaction products thereof.

2. The primer composition according to claim 1 which is stable at 60° C. for at least about 60 days when stored in a substantially moisture-free environment.

3. The primer composition according to claim 1 comprising, by weight, at least about 75% of the organic solvent and about 1% to about 15% of the aliphatic isocyanate-containing compound, based on the total weight of the primer composition.

4. The primer composition according to claim 3 comprising, by weight, about 0.25% to about 10% of the nonhalogenated hydrocarbon polymer containing organic functional groups, based on the total weight of the primer composition.

5. The primer composition according to claim 4 comprising, by weight, about 0.5% to about 10% of the halogenated hydrocarbon polymer containing organic functional groups.

6. The primer composition according to claim 1 wherein the aliphatic isocyanate-containing compound is a saturated aliphatic isocyanate.

7. The primer composition according to claim 6 wherein the saturated aliphatic isocyanate-containing compound is selected from the group consisting of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, and oligomers and combinations thereof.

8. The primer composition according to claim 1 wherein the aliphatic isocyanate-containing compound is selected from the group consisting of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, dimer acid isocyanate, xylene diisocyanate, benzene- 1,3-bis(1-isocyanato-1-methylethyl), benzene-1,4-bis( I -isocyanato-1-methylethyl), and oligomers and combinations thereof.

9. The primer composition according to claim 1 wherein the aliphatic isocyanate-containing compound is the reaction product of an aliphatic isocyanate and an active hydrogen-containing compound.

10. The primer composition according to claim 9 wherein the active hydrogen-containing compound is selected from the group consisting of ethylene glycol, 1,4-butanediol, 1,6-hexanediol, trimethylol propane, pentaerythritol, 1,4-cyclohexane dimethanol, polyester polyol, polycarbonate polyol, polytetramethylene oxide polyether polyol, polypropylene oxide polyether polyol, polyethylene oxide polyol, and combinations thereof.

11. The primer composition according to claim 1 wherein the nonhalogenated hydrocarbon polymer containing organic functional groups includes functional groups selected from the group consisting of carboxylic acid anhydride groups, hydroxyl groups, epoxide groups, carboxylic acid ester groups, carboxylic acid amide groups, carboxylic acid groups, and combinations thereof.

12. The primer composition according to claim 11 wherein the nonhalogenated hydrocarbon polymer containing organic functional groups is selected from the group consisting of a styrene-ethylene/butylene-styrene triblock copolymer modified with maleic anhydride, an ethylene-propylene copolymer modified with maleic anhydride, a propylene polymer modified with maleic anhydride, an ethylene/butylene copolymer containing hydroxyl endgroups, an ethylene vinyl acetate copolymer, an ethylene vinyl acetate copolymer modified with maleic anhydride, and blends or the reaction products of two or more of these polymers.

13. The primer composition according to claim 1 wherein the organic solvent is selected from the group consisting of an aliphatic ester, an aliphatic hydrocarbon, an aromatic hydrocarbon, a halogenated aromatic or aliphatic hydrocarbon, and mixtures thereof.

14. The primer composition according to claim 13 wherein the organic solvent is a mixture of xylene and cyclohexane.

15. The primer composition according to claim 1 further comprising a silane coupling agent.

16. The primer composition according to claim 15 further comprising up to about 10% of silane coupling agent, based on the total weight of the primer composition.

17. The primer composition according to claim 1 further comprising an epoxy resin.

18. The primer composition comprising a solution of:
   (a) an aliphatic isocyanate-containing compound selected from the group consisting of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, and oligomers and combinations thereof;
   (b) a nonhalogenated hydrocarbon polymer containing organic functional groups, wherein the functional groups are selected from the group consisting of carboxylic acid anhydride groups, hydroxyl groups, epoxide groups, carboxylic acid ester groups, carboxylic acid amide groups, carboxylic acid groups, and combinations thereof;
   (c) a halogenated hydrocarbon polymer containing organic functional groups, wherein the polymer is selected from the group consisting of a chlorosulfonated polyethylene, a chlorosulfonated polypropylene, a chlorinated polypropylene modified with maleic anhydride, a chlorinated polyethylene modified with maleic anhydride, and blends or reaction products thereof; and
   (d) an organic solvent.

19. The primer composition according to claim 18 wherein the nonhalogenated hydrocarbon polymer containing organic functional groups is selected from the group consisting of a styrene-ethylene/butylene-styrene triblock copolymer modified with maleic anhydride, an ethylene-propylene copolymer modified with maleic anhydride, a propylene polymer modified with maleic anhydride, an ethylene/butylene copolymer containing hydroxyl endgroups, an ethylene vinyl acetate copolymer, an ethylene vinyl acetate copolymer modified with maleic anhydride, and blends or the reaction products of two or more of these polymers.

20. A primer composition preparable by combining components comprising an aliphatic isocyanate-containing compound, a nonhalogenated hydrocarbon polymer containing organic functional groups, a halogenated hydrocarbon polymer containing organic functional groups, and an organic solvent, wherein the halogenated hydrocarbon polymer containing organic functional groups is selected from the group consisting of a chlorosulfonated polyethylene, a chlorosulfonated polypropylene, a chlorinated polypropylene modified with maleic anhydride, a chlorinated polyethylene modified with maleic anhydride, and blends or reaction products thereof.

21. A primer composition comprising an incipient aliphatic isocyanate-containing compound, an incipient nonhalogenated hydrocarbon polymer containing organic functional groups, an incipient halogenated hydrocarbon polymer containing organic functional groups, and an organic solvent; wherein the halogenated hydrocarbon polymer containing organic functional groups is selected from the group consisting of a chlorosulfonated polyethylene, a chlorosulfonated polypropylene, a chlorinated polypropylene modified with maleic anhydride, a chlorinated polyethylene modified with maleic anhydride, and blends or reaction products thereof.

22. A primer composition comprising an aliphatic isocyanate-containing compound, about 0.25% to about 10% by weight of a nonhalogenated hydrocarbon polymer containing organic functional groups, about 0.5% to about 10% by weight of a halogenated hydrocarbon polymer containing organic functional groups, and an organic solvent; wherein the nonhalogenated hydrocarbon polymer containing organic functional groups is selected from the group consisting of a styrene-ethylene/butylene-styrene triblock copolymer modified with maleic anhydride, an ethylene-propylene copolymer modified with maleic anhydride, a propylene polymer modified with maleic anhydride, an ethylene/butylene copolymer containing hydroxyl endgroups, an ethylene vinyl acetate copolymer, an ethylene vinyl acetate copolymer modified with maleic anhydride, and blends or the reaction products of two or more of these polymers.

23. The primer composition of claim 22 wherein the halogenated hydrocarbon polymer containing organic functional groups is selected from the group consisting of a chlorosulfonated polyethylene, a chlorosulfonated polypropylene, a chlorinated polypropylene modified with maleic anhydride, a chlorinated polyethylene modified with maleic anhydride, and blends or reaction products thereof.

24. The primer composition according to claim 23 which is stable at 60° C. for at least about 60 days when stored in a substantially moisture-free environment.

25. The primer composition according to claim 23 comprising, by weight, at least about 75% of the organic solvent and about 1% to about 15% of the aliphatic isocyanate-containing compound, based on the total weight of the primer composition.

26. The primer composition according to claim 23 wherein the aliphatic isocyanate-containing compound is a saturated aliphatic isocyanate.

27. The primer composition according to claim 26 wherein the saturated aliphatic isocyanate-containing compound is selected from the group consisting of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, and oligomers and combinations thereof.

28. The primer composition according to claim 22 wherein the aliphatic isocyanate-containing compound is selected from the group consisting of 1,6-hexamethylene diisocyanate, methylene bis(4-cyclohexyl isocyanate), trimethyl hexamethylene diisocyanate, isophorone diisocyanate, γ-isocyanatopropyl trimethoxysilane, dimer acid isocyanate, xylene diisocyanate, benzene-1,3-bis(1-isocyanato-1-methylethyl), benzene-1,4-bis(1-isocyanato-1-methylethyl), and oligomers and combinations thereof.

* * * * *

UNITED STATES PATENT AND TRADEMARK OFFICE
CERTIFICATE OF CORRECTION

PATENT NO.   : 6,008,286
DATED        : December 28, 1999
INVENTOR(S)  : James D. Groves It is certified that error appears in the above-identified patent and that said Letters Patent is hereby corrected as shown below:

Column 1,
Line 38, "itself Typically" should read -- itself. Typically, --.

Column 4,
Line 56, "Hüils" should read -- Hüls --.

Column 8,
Line 42, "KRATON G - 165T" should read -- KRATON G - 1657 --.
Lines 55-56, "KIMWIPF" should read -- KIMWIPE --.

Column 9,
Lines 26-27, "nonfictional" should read -- nonfunctional --.

Column 10,
Line 66, "Control 1," should read -- Control I, --.

Column 12,
Line 41, "benzene-1,4-bis (1-isocyanato-1-methylethyl)," should read -- benzene-1,4-bis (1-isocyanato-1-methylethyl). --.

Column 14,
Line 57, "claim 22" should read -- claim 23 --.

Signed and Sealed this

Ninth Day of October, 2001

Attest:

NICHOLAS P. GODICI
Attesting Officer    Acting Director of the United States Patent and Trademark Office